United States Patent [19]
Nicosia

[11] 3,945,553
[45] Mar. 23, 1976

[54] SOLDER IRON TIPS
[76] Inventor: Joseph T. Nicosia, 13 Hileen Drive, Kings Park, N.Y. 11754
[22] Filed: Nov. 8, 1973
[21] Appl. No.: 414,166

[52] U.S. Cl. ................................ 228/20; 228/53
[51] Int. Cl.² ........................................ B23K 3/02
[58] Field of Search .............. 228/19, 20, 51–55; 219/230

[56] References Cited
UNITED STATES PATENTS

| | | | |
|---|---|---|---|
| 1,172,161 | 2/1916 | Moench | 228/52 |
| 3,003,049 | 10/1961 | Thomas | 219/230 UX |
| 3,172,382 | 3/1965 | Weglin | 228/20 |
| 3,316,384 | 4/1967 | Daniels | 228/19 X |
| 3,580,462 | 5/1971 | Vanyi | 228/51 |
| 3,673,681 | 7/1972 | Steranko | 228/51 X |
| 3,726,464 | 4/1973 | Howell et al. | 228/19 |

Primary Examiner—Al Lawrence Smith
Assistant Examiner—K. J. Ramsey
Attorney, Agent, or Firm—Darby & Darby

[57] ABSTRACT

A soldering iron and tip therefor in which the tip has a bore along its longitudinal axis with a transverse vent opening through the tip connecting with the bore to increase the capillary action of drawing solder up into the bore. An arrangement is also provided for threading a braided wire into the bore to further enhance the capillary action. In the latter case it is preferred that a second hole be formed in the tip at an angle to the bore.

19 Claims, 21 Drawing Figures

SOLDER IRON TIPS

In U.S. Pat. No. 3,580,462 to Vanyi issued on May 25, 1971, a soldering apparatus is disclosed which utilizes a stylus-like solder tip as a part of a soldering iron. The solder tip has a tubular sleeve surrounding one or more rods for producing capillary action to draw heated solder from an area, such as a re-heated connection, into the bore of the sleeve between the rods by capillary action. As an alternative to this, the said patent also discloses a tip merely having a single bore therethrough to draw off the solder by capillary action.

The present invention relates to improvements in the general types of soldering tips disclosed in the aforesaid U.S. Pat. No. 3,580,462. In accordance with the subject invention, a tip is provided which also has the longitudinal bore, or passage, through at least a portion of the length thereof. In accordance with the improvement in the invention, a vent hole is made through the tip to the bore to provide communication between the atmosphere and the bore. The vent hole provides increases in capillary action for drawing off the solder from an area. In addition, it presents a further exit for the molten solder to be removed from the passage either by suction or by mechanical movement of the soldering tip. As a further advantage, suction can be applied through the vent to draw off the solder. The use of the vented tip provides control and uniformity in the soldering operation since excess solder will be drawn up into the bore leaving only the solder necessary to make the connection.

In a preferred embodiment of the invention a further opening is made from the outside of the tip to the bore. Braided wire is fed through this further opening into the bore to aid in the capillary action. Also, the braid can be used as a brush.

It is therefore an object of the invention to provide a novel tip for soldering irons.

A further object is to provide a tip for soldering irons utilizing capillary action.

It is still a further object to provide a tip for soldering irons utilizing capillary action by means of a bore with a vent hole to the bore to aid in the capillary attraction of the solder as well as the removal therefrom from the tip.

A further object is to provide a solder tip having a bore therein for drawing or applying solder by capillary action and an arrangement for removing the solder in the tip by suction.

Yet another object is to provide a solder tip having a central bore into which a braided wire can be fed from outside of the tip.

Other objects and advantages of the present invention will become more apparent upon reference to the following specification and annexed drawings, in which.

Figure 1:
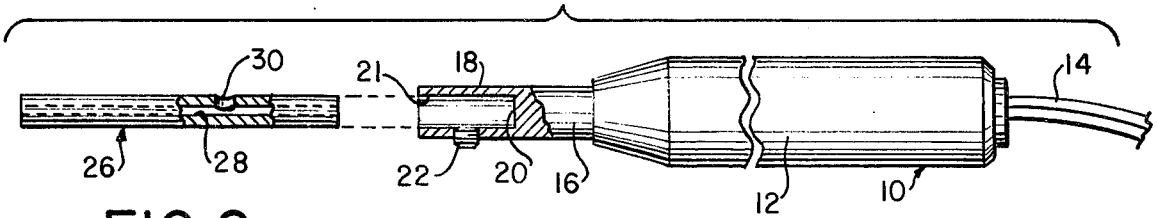
FIG. 1 is an exploded view in plan showing a typical type of soldering iron and a tip therefor in accordance with the invention.

Referring to the drawings, FIG. 1 shows a typical electrically heated soldering iron 10. The iron 10 includes the usual handle 12 of heat-insulating material such as wood or a high temperature resistant plastic. A line cord 14 exits from the handle to be connected to a suitable source of current (not shown) to energize a heating element (not shown) housed in the iron handle 12. The heating element is of any conventional construction as is the iron 10. The heat produced is conveyed to a metallic heat-conductive portion 16 of the iron which terminates in a sleeve 18, having an internal end wall 20. A set screw 22 is located in the sleeve and a solder tip 26 is placed in an opening 21 and held therein in heat-conductive relationship by the set screw 22. The rear end of the tip is normally placed against the internal end wall 20 of sleeve 16.

FIG. 1 also shows an embodiment of solder tip 26 of the subject invention. Tip 26 includes an elongated tubular piece of metal of any suitable length having a through bore 28 on its longitudinal central axis. In the embodiment of FIG. 1, bore 28 runs the length of the tip. The internal diameter of bore 28 is made relatively small so as to provide capillary action with respect to solder to be drawn thereinto.

In accordance with the invention, a vent hole 30 is also formed in the tip 26 from the outer surface to communicate with bore 28. The vent hole is at an angle, shown in FIG. 1, to bore 28 and, in the preferred type, is transverse to the bore. In FIGS. 1–14 described herein the vent extends through about half the diameter of the respective portion of the tip. In FIGS. 15A–15F and 16 it extends through the tip. In general, it is preferred that the diameter of the vent be somewhat larger than the bore. However, they can be made the same diameter. The vent is preferably formed by drilling or processing the tip material. The bore can also be drilled or, as described below, the tip can be originally made from tubular material.

In all of the embodiment of the invention described herein, when the tip is inserted into the sleeve of the iron, the vent is clear of the sleeve to communicate with the atmosphere.

The soldering iron and tip of FIG. 1 are used to solder in the conventional manner. The iron 10 is heated and the end of tip 26 is applied to the area to be soldered and then the solder is applied and it melts. During the soldering operation the bore and vent serve to draw up excess solder from the connection by capillary action. This essentially provides controlled soldering since excess solder is removed leaving only the solder necessary to make the connection. This provides a more uniform connection which is highly reliable. This makes the tip highly useful for production, repair and hobby applications.

In a desoldering operation the free end of tip 26 is applied adjacent to, or on top of, the solder to be melted. The solder melts and is drawn up into the bore 28 by capillary action.

The vent 30 serves two purposes during both soldering and desoldering. First, it provides an air passage from the atmosphere to the bore 28 so that the capillary action will be increased to more readily draw the molten solder up the capillary bore 28. The molten solder can be drawn up the bore to the area of the vent.

The prior art arrangement of U.S. Pat. No. 3,580,462, cannot draw molten solder as far up into its passage as can be drawn in the bore of the present invention using the vent. The second purpose served by the vent is to remove the solder in the bore. To do this, it is only necessary to flick the iron and tip. When this is done, the solder leaves the tip both from the free open end of bore 28 and the vent 30.

Figure 2:
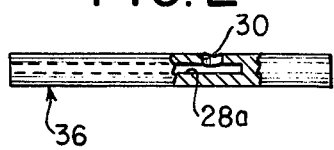
FIGS. 2 through 7 are plan views showing other types of tips according to the subject invention.

The material for the tip 26 of FIG. 1, as well as the materials for the other tips of the invention described herein, can be made of any suitable material, for example, copper or brass. In general, a material with a high-heat conductivity is preferred and copper has been found quite suitable for this. As an alternative, brass is also suitable. In the embodiment of FIG. 1, the bore 28 runs the entire length of tip 26. This is not absolutely necessary. As shown in FIG. 2, the bore 28a of tip 36 terminates at, or slightly beyond, the vent 30. In any case, when the tip 36 of FIG. 2 is inserted into the iron, the bore 30 must still be free to communicate with the atmosphere.

The use of the through bore 28, as shown in FIG. 1, provides an advantage in that the tip can be made from tubular material in which the bore is already present rather than drilling or machining the bore 28a as would be required in the embodiment shown in FIG. 2. In either case, the same materials can be utilized.

Figure 3:
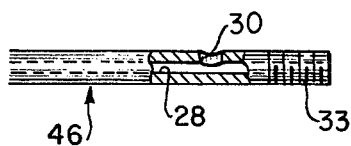

FIG. 3 still shows a further embodiment of the invention which is similar to that of FIG. 1. Here, a tip 46 is provided with a threaded end 33 for threading into a socket (not shown) of a type of soldering iron that uses a threaded tip. Tip 46 has a through bore 26. It can be made of solid material and then machined with the bore, vent and thread, or, alternatively, it can be made of tubular material in that only the vent 30 and thread 33 need be machined.

Figure 4:
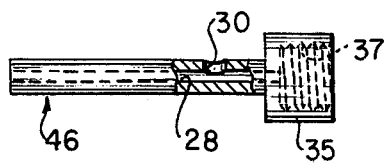

FIG. 4 shows another embodiment in which a tip 46 having a through bore 28 is provided with a rear connector 35 for threading onto a threaded plug of another conventional type soldering iron. Here, the connector 35 with its internal threads 37 would have to be connected to the reduced diameter portion of the tip 46. The tip of both FIGS. 2 and 3 operate in the same manner as the tip of FIG. 1 for both soldering and desoldering.

Figure 5:
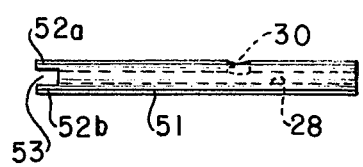
Figure 6:
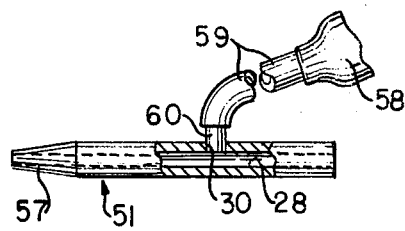
Figure 7:
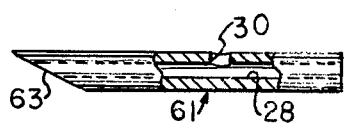
Figure 8:
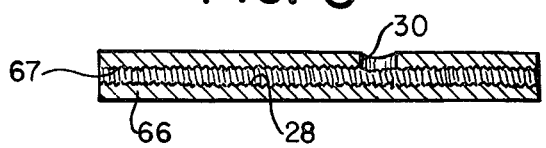
FIGS. 8 and 9 are cross-sections of still further embodiments of the invention.

Any of the embodiments of the tips of FIGS. 1–4 can be provided with a shaped free end working surface. FIGS. 5, 6 and 7 show different types of working surfaces. In FIG. 5 the front end of the tip 51 is forked, or tined, with spaced ends 52a and 52b, defining an opening 53. The bore 28 communicates with the end surface of opening 53. The opening 53 can be placed over a wire having solder thereon and the molten solder will be drawn up with the opening.

In FIG. 6, the front portion 57 of the tip 51 is tapered down into a generally conical shape. Cone 57 can be formed by any suitable process, for example, machining a solid piece of material originally used for the tip. Where tubular material is used for the tip 56, it is also possible to draw or compress down the diameter to the conical shape.

FIG. 6 shows a further modification of the invention in which a small tube 60 is attached to the outside of the tip 56 at the vent 30. A solder sucker, including a syringe bulb 58 is connected to the tube 60 by a flexible heat-resistant tube 59. By squeezing and releasing the syringe bulb 59, solder can be drawn into the syringe. This clears out the bore 28 without having to flick the iron. The solder sucker arrangement also can be used to control the clearing of solder from the heated connection.

In FIG. 7, the tip 61 has a chisel end 63 which can be formed by cutting or grinding off the end of the tip 61 at the desired angle. The bore 28 terminates at the face of the chisel end 63. The tips of FIGS. 5 and 7 can be utilized, for example, to pry off leads from a circuit board as well as to draw up the solder by capillary action.

Figure 9:
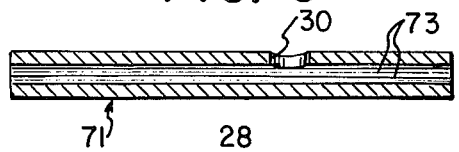

The interior surface of capillary bore 28 need not be smooth. Instead, as shown in the cross-section of FIG. 8, the bore of tip 66 is machined with a tool suitable to produce a rough interior surface, such as knurl, as shown at 67. The roughening of the interior surface of the bore provides additional paths for the capillary action to take place, thereby increasing the flow of the molten solder material. FIG. 9 shows a tip 71 similar to that of FIG. 8. Here, the internal bore 28 is formed with a number of lands 73 extending parallel to the bore's longitudinal axis. This aids in the flow of the wet solder in the bore.

Figure 10:
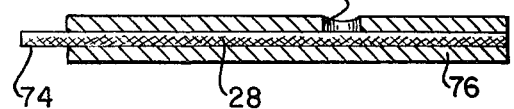
FIG. 10 is a plan view of another embodiment of a tip.

FIG. 10 shows a still further embodiment of the invention. Here a piece of wire braid 74 is placed within the length of bore 28 and extends out past the front of the working end. The braid 74 is heated and acts to provide an increased number of capillary passages for the wet solder to travel up the length of the bore. Such an arrangement is useful in desoldering and, also, using the free end of the braid 74 to push through holes, such as in printed circuit boards, to clean out the holes for further use. Instead of using braid, stranded wire can be used. The material for the braid can be either of the type to which solder will or will not adhere. In either case, the capillary action still takes place. The vent 30 of tip 76 serves the same purpose as previously described.

Figure 11:
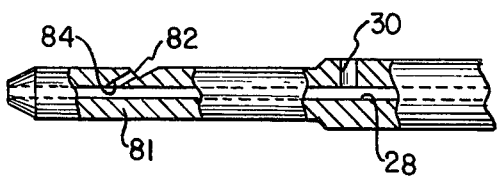
FIGS. 11 through 14 are plan views of a further embodiment of a tip.
Figure 12:
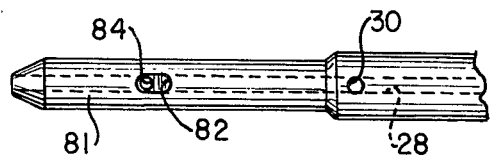
Figure 13:
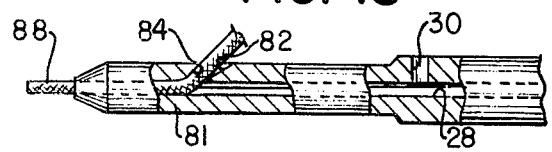

FIGS. 11 through 13 show a still further embodiment a tip 81 where, in addition to the vent hole 30 provided to communicate with the bore 28, a slot 82 is formed between the vent 30 and the work end. The slot 82 is preferably formed with the trailing end (toward the rear of the tip). The leading end is also angled. A hole 84 is cut from the slot to the bore 28. The hole 84 is angled toward the working end of the tip. As shown in FIG. 13, a small piece of braid or stranded wire 88 is passed into the slot 82, through the hole 84 into the bore 28. The free end of the braid 88 extends beyond the working end of the tip.

The tip of FIGS. 11 through 13 has several advantages over that shown in FIG. 10. For example, the tip 76 of FIG. 10 cannot readily be used for soldering as well as desoldering. That is, it is difficult to solder a connection when the braid 74 is in place in the tips of FIG. 10.

In the embodiment shown in FIGS. 11 through 13, it is a simple matter to pull on the braid 88 to remove it either from the front end or the slot 82 and hole 84. Thus the tip can be used for soldering as well as desoldering. Further, the small strip of braid 88, when saturated with solder, can be repeatedly reactivated in the same flicking motion of the iron as when using the hollow tip without the braid. That is, since both ends of the braid extend out from the tip the solder attracted into the braid by the capillary action can be flicked off of both ends.

In general, the hollow tip of FIGS. 11 through 13 does an excellent job of desoldering surface connections. The braid acts as a "brush" when extended into plated through holes such as found in circuit boards and commerical computer boards. The braid 88 can be used repeatedly and a new length can be pulled out from the front end of the tip as the material is consumed by normal wear and tear.

The use of a relatively small strip of braid is preferred in a tip of the type shown in FIG. 13 since larger strips would be cumbersome and act as unwanted heat sinks.

The tip of FIG. 13 can be further improved by having the strands of the braid clad with a material, such as iron, which will not hold solder. In this case, the capillary action will still take place in the bore between the strands of the braid. The tip itself, if ironclad, must be solder-wettable in the axial bore 28 as well as externally where it is to make contact with the solder area.

Ironclad braiding can be permanently attached to the end of an ironclad tip. This arrangement would result in longer life of the materials but would necessarily be more expensive.

Figure 14:
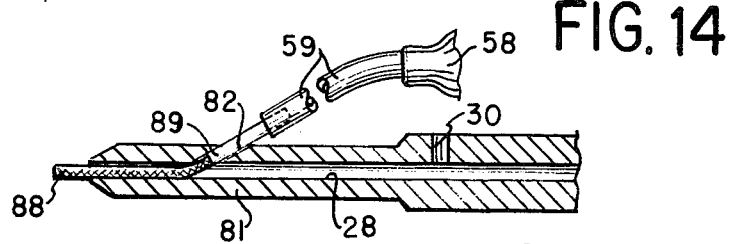

In FIG. 14 a tube 89 is attached to the tip 81 in the slot 82 to communicate with the bore 28. A solder sucker such as the syringe bulb 58 and tube 59 shown in FIG. 6, can be used to draw solder out of the bore 28. The braid 88 is passed through the tube 89.

It is not necessary to have a tube such as 60 of FIG. 6 or 89 of FIG. 14 fixed to the tip in order to use the solder sucker 58–59. Instead, a hollow needle (not shown) can be attached to the end of the tubing 59 and the needle held in the vent hole duirng the time the syringe bulb is operated.

FIGS. 15A through 15F show a still further embodiments of the invention. Here, the tip 91 has an axial bore 28a which extends only part way of the length of the tip, as in FIG. 2. Two holes 95 and 97 are formed diametrically through the tip to communicate with the bore 28a. Hole 95 is in the forward, reduced diameter, part of the tip while hole 97 is in the rear, enlarged diameter portion. The holes can be made by drilling or any other process.

Figure 15A:
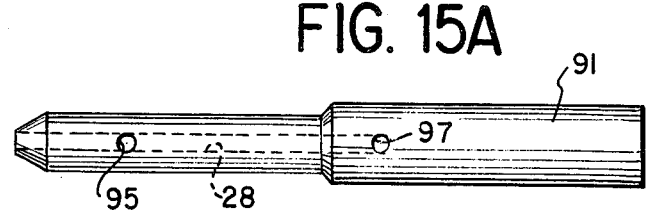
FIGS. 15A–15F are plan views, partly in cross-section, of another embodiment of the invention.
Figure 15B:
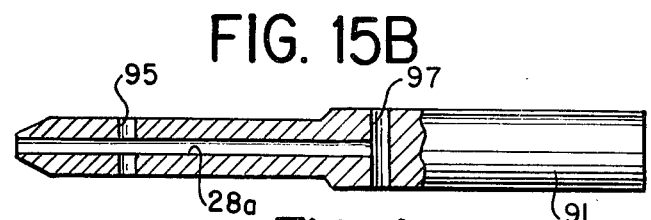
Figure 15C:
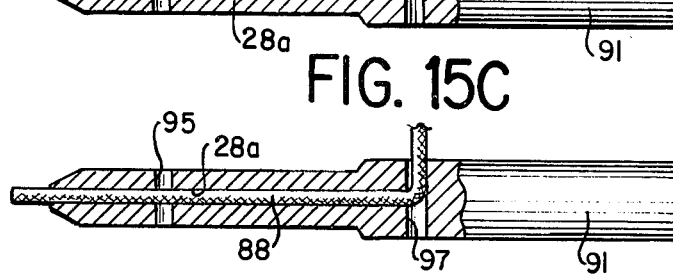

FIG. 15C shows a piece of braid 88 passed through the bore 28a, extending through the front end of the tip and through one exit of the rear hole 97. As in the case of FIGS. 11 through 13, the braid 88 enhances capillary action. In this embodiment, several vent passages are provided. There is one vent passage from each end of the forward hole 95 to the bore 28a and one from the open end of the rear hole 97 which is not occupied by the braid. The passage in the rear hole 97 is the most effective for vent action since the solder is drawn along the length of the braid for at least up till the termination of bore 28a at the hole 97.

Figure 15D:
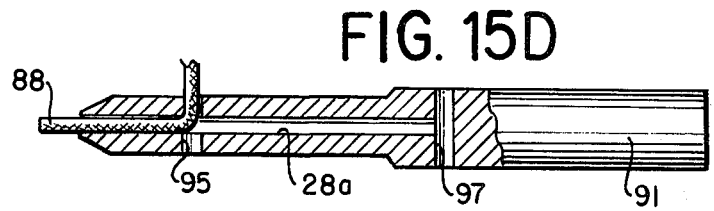

In FIG. 15D, the braid 88 is shown extending from one end of the front hole 95 through the bore 28a and out the front end of the tip. In this case, the entire hole 97 is available for vent action.

In each of the cases shown in FIGS. 15C and 15D, the braid 88 is used for desoldering in the manner previously described. For soldering operations, the braid would be removed.

Figure 15E:
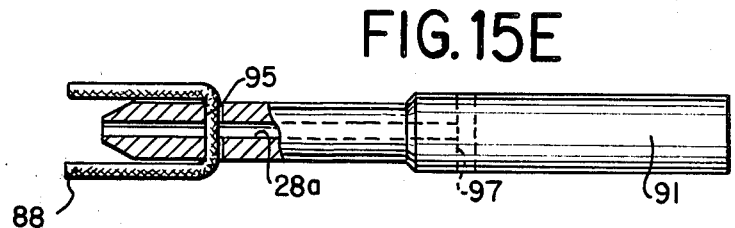
Figure 15F:
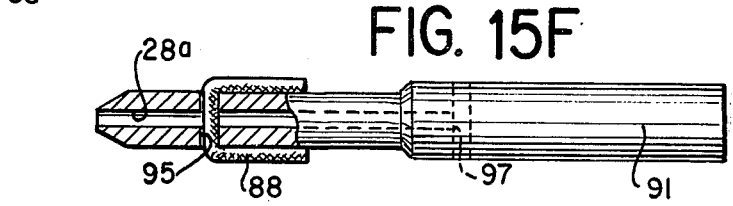

FIGS. 15E and 15F show an arrangement for removing large amounts of solder by capillary action. Here, the braid 88 extends completely through the forward hole 95 in the tip. When desoldering, the braid is bent toward the front of the tip and a large capillary attractive surface is presented by the ends of the braid to the area to be desoldered. The rear hole 97 provides the vent action for bore 28a. When it is desired to use the tip for soldering, the ends of the braid 88 are bent backward as shown in FIG. 15F so that the front, active, end of the tip is exposed.

Figure 16:
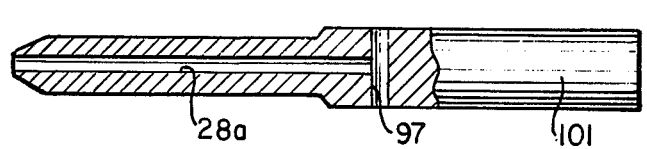
FIG. 16 is a plan view, also partly in cross-section, of still a further embodiment of the invention.

FIG. 16 shows a further modification in which the tip 101 has only the hole 97 in the rear, enlarged diameter, portion of the tip. This arrangement, as is the case of all other tips used without the braid, can be used for controlled soldering as well as for desoldering. However, if desired, the braid 88 can be utilized in the same manner shown in FIG. 15C.

In the tips shown in FIGS. 15 and 16, the axial bore 28 terminates at the rear hole 97. As explained previously with respect to FIGS. 1 and 5 through 14, the tip can be formed of tubular material in which case the bore 30 would extend the complete length of the tip.

The use of non-corrosive solder pastes of fluxes greately increases the usefulness of the vented tips when used as a controllable soldering device, that is with no wire braid, as well as in the brush configuration with the braid.

What is claimed is:

1. A tip for a soldering iron in which the tip is an elongated generally cylindrical member of heat conductive material, said tip having an active end for placement adjacent an area where solder is to be melted and another end adapted for connection to a solder iron for heating the tip, a single bore only for substantially uniform diameter throughout formed axially in said tip extending along at least a portion of the length thereof and having an opening at the active end of the tip, said tip also formed with a vent passage which extends from the outer surface of the tip at a point spaced from the active end through at least a part of said tip to communicate with said bore and a piece of wire braid material extending through said vent passage into said bore and out of the active end of the tip to provide a plurality of capillary passages to molten solder.

2. A tip as in claim 1 wherein said vent passage is formed only part way through the tip to provide only one opening to the bore.

3. A tip as in claim 1 wherein said vent passage is formed through the tip to provide a pair of openings to the bore.

4. A tip as in claim 1 wherein the bore extends the length of the tip.

5. A tip as in claim 1 wherein said bore extends only part way of the length of the tip from the active end thereof at least until said vent passage.

6. A tip as in claim 1 wherein the active end is forked with at least a pair of tines, the bore opening in the tip located between said tines.

7. A tip as in claim 1 wherein the active end of the tip is formed with a face at an angle to the tip longitudinal axis, the opening of the bore located at a point on the face.

8. A tip for a soldering iron in which the tip is an elongated generally cylindrical member of heat conductive material, said tip having an active end for placement adjacent an area where solder is to be melted and another end adapted for connection to a solder iron for heating the tip, a single bore only of substantially uniform diameter throughout formed axially in said tip extending along at least a portion of the length thereof and having an opening at the active end of the tip, said tip also formed with a vent passage and a second passage which extend from the outer surface of the tip at points spaced from the active end through at least a part of said tip to communicate with said bore with said second passage being more remote from the active end of the tip than said first passage, and a piece of wire braid material extending through one of said passages, said bore and out of the opening of said bore at the active end of the tip to provide a plurality of capillary passages for molten solder.

9. A tip as in claim 8 wherein said second passage is formed only part way through the tip to provide only one opening to the bore.

10. A tip as in claim 8 wherein said second passage is formed through the tip to provide a pair of openings to the bore.

11. A tip as in claim 9 wherein said vent passage is formed only party way through the tip to provide only one opening to the bore.

12. A tip as in claim 9 wherein said vent passage is formed through the tip to provide a pair of openings to the bore.

13. A tip as in claim 8 wherein the piece of wire braid material extends through said second passage and out the opening of the bore at the active end of the tip to provide the plurality of capillary passages.

14. A tip as in claim 8 wherein the opening of said vent passage at the surface of the tip is a slot having at least one surface angled.

15. A tip as in claim 14 wherein the piece of wire braid material extends through the angled opening of said vent, said bore and out of the opening of the bore at the active end of the tip to provide the plurality of capillary passages.

16. A tip as in claim 8 wherein the piece of wire braid material extends from the vent passage through the bore and out the bore opening at the active end of the tip to provide the plurality of capillary passages.

17. A tip as in claim 8 further comprising means external to said tip for drawing molten solder out of said bore through said wire braid.

18. A tip as in claim 8 wherein the cylinder is stepped and of different diameters, said second passage located in the larger diameter cylinder.

19. A tip for a soldering iron in which the tip is an elongated generally cylindrical member of heat conductive material, said tip having an active end for placement adjacent an area where solder is to be melted and another end adapted for connection to a solder iron for heating the tip, a single bore only of substantially uniform diameter throughout formed axially in said tip extending along at least a portion of the length thereof and having an opening at the active end of the tip, the diameter of said bore being such as to provide capillary action to molten solder, said tip also formed with a vent passage and a second passage which extend from the outer surface of the tip at points spaced from the active end through at least a part of said tip to communicate with said bore with said second passage being more remote from the active end of the tip than said first passage, one of said vent and second passages being formed through the tip to provide a pair of openings to the bore, and a piece of wire braid material extending through the said pair of openings of said one passage and communicating with said bore.

* * * * *